Figure 1:
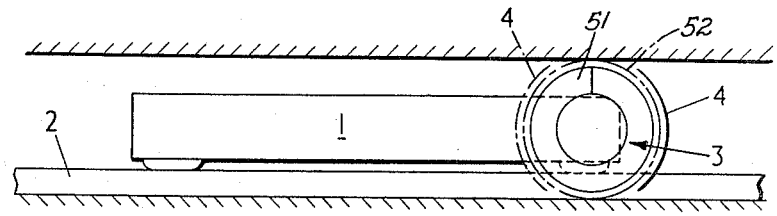

Dec. 13, 1966  T. G. RAE  3,291,533
LONGWALL MINING MACHINES
Filed July 17, 1963  4 Sheets-Sheet 1

Inventor
Thomas Gordon Rae
By Stevens, Davis, Miller & Mosher
Attorneys 3,291,533
LONGWALL MINING MACHINES
Thomas Gordon Rae, Ashby-de-la-Zouch, England, assignor to Coal Industry (Patents) Limited, London, England, a company of Great Britain
Filed July 17, 1963, Ser. No. 295,739
Claims priority, application Great Britain, July 20, 1962, 28,029; Oct. 23, 1962, 40,072
8 Claims. (Cl. 299—45)

This invention relates to rotary cutting assemblies for mining machines, having a rotary cutting head of the shearer drum or disc type carrying cutter picks and adapted to rotate about an axis arranged transverse to the direction of movement of the machine. The invention has particular application to machines which in operation travel parallel to a mine conveyor on to which the mineral cut by the rotary cutting assembly is loaded.

It has been proposed to provide such a machine with a plough-deflector unit or a loader unit arranged to the rear of the rotary cutting head and adapted to transfer cut mineral onto the conveyor when the machine is cutting, and to plough or load loose mineral on to the conveyor on the "flitting" or return run of the machine.

It is an object of the present invention to provide an improved rotary cutting assembly for a mining machine, which is capable itself of directing substantially the whole of the mineral cut by the cutting assembly directly on to a face conveyor.

According to the present invention, a rotary cutting assembly for a mining machine comprises a rotary cutting head of the shearer drum or disc type adapted to carry cutter picks and bodily movable in a direction transverse to the axis of rotation of the said rotary cutting head to effect cutting of a mineral face, said rotary cutting head being adapted to discharge cut debris axially from the cutting head upon rotation of the latter, said rotary cutting assembly further comprising a cowl plate having a curved surface of part-cylindrical form for arrangement closely adjacent and parallel to a portion of the circular path swept out by the cutter picks, the said curved surface having an axial length in the direction of the axis of the cylinder at least equal to the axial length of the said rotary cutting head and a height in a direction perpendicular to the said first direction approximately equal to the overall diameter of the rotary cutting head.

In operation the cowl is positioned so as to effectively enclose the trailing portion of the rotary cutting head and serves to maintain the cut mineral in close contact with the said cutting head, thus the discharging action of the latter effectively loads in toto the cuttings, and the usual plough-deflector or loader unit can be dispensed with.

In a convenient arrangement, the said cowl is adapted to be located selectively at one side or other of the axis of rotation of the rotary cutting head so that the trailing portion of the latter can be effectively enclosed regardless of the direction of movement of the machine. This arrangement enables the machine to cut and load in both directions of movement, and the flitting or non-cutting run can thus be dispensed with.

The cowl may be releasably attached to suitable mounting brackets provided on the mining machine or alternatively, the cowl may be adapted to pivot about the axis of rotation of the rotary cutting head, so that, when suitable height provision exists or can be made, the cowl can be swung over the rotary cutting head when it is required to reverse the direction of cutting. Preferably the cowl is in the form of an arcuate plate of part-cylindrical form and may be secured to an inner cylindrical sleeve co-axial with the axis of curvature of the said plate and adapted to be rotatably mounted about a drive shaft for the rotary cutting head.

Figure 2:
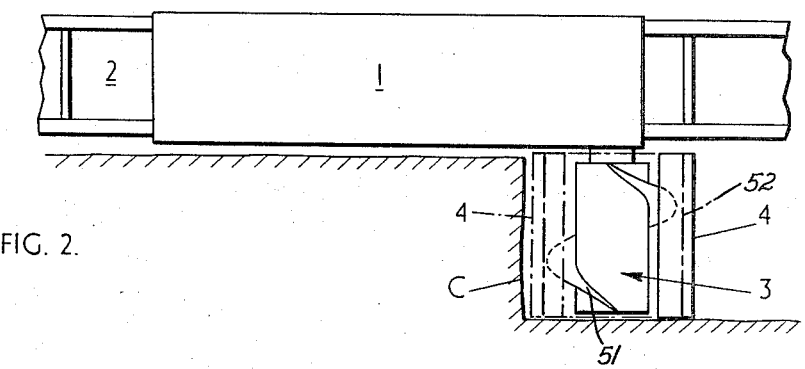
Figure 3:
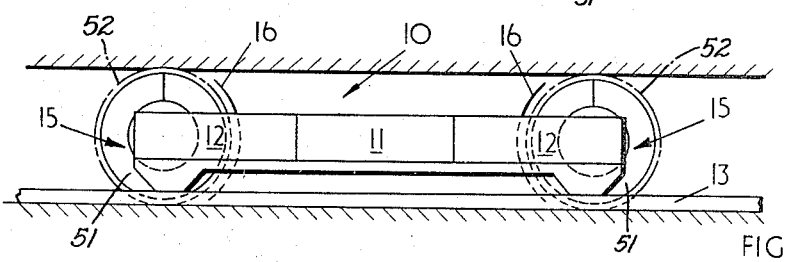
Figure 4:
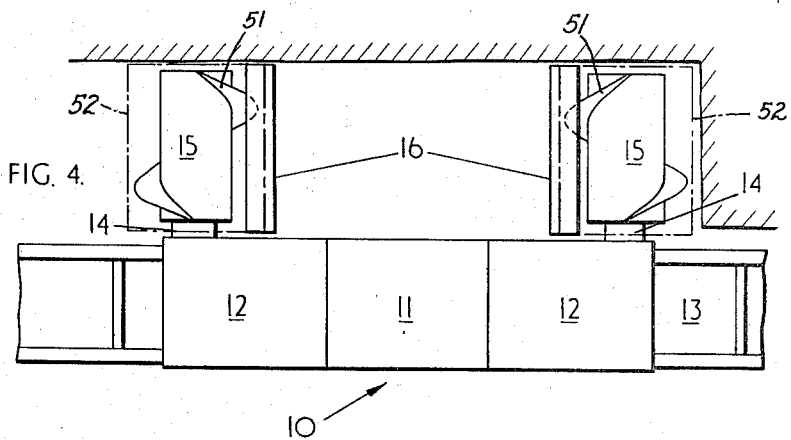

Two embodiments of the invention, given by way of example only, are hereinafter described with reference to the accompanying drawing in which:

FIGURE 1 shows schematically a side view of a mining machine having a rotary cutting assembly constructed according to the present invention, FIGURE 2 shows a plan view corresponding to FIGURE 1, FIGURE 3 shows schematically a side view of an alternative embodiment of the invention, FIGURE 4 shows a plan view corresponding to FIGURE 3, FIGURES 5, 6 and 7 show respectively a side, plan and end view to a larger scale of cowl forming part of a rotary cutting assembly.

Referring firstly to FIGURES 1 and 2, the illustrated machine consists of a main body 1 incorporating haulage means, motor and gear head and arranged to move along a conveyor 2 in known manner. A rotary cutting assembly including a cutting head 3 is provided which rotates about an axis extending transverse to the direction of movement of the machine, and carries cutter picks, the path of the extremities of which are indicated by chain lines 52 which operate on the buttock C (see FIGURE 2) of a face to win coal. In the drawing the machine is assumed to be moving from right to left.

The rotary cutting head 3 is provided with one or more helical members 51 and the directions of the helices are such that upon rotation, the helical members 51 move the cuttings from the coal face on to the conveyor 2 with a scroll action. Effectively enclosing the trailing portion of the rotary cutting head 3 is an arcuate cowl 4 which is mounted on the machine body 1 by means of one or more brackets (not shown). The cowl 4 is of part-cylindrical form and is arranged closely adjacent and parallel to a portion of the circular path 52 swept out by the cutter picks (not shown) mounted on the rotary cutting head 3 cutter picks (not shown) on the head 3 obtain clearance for the end of the head adjacent the mineral face in known manner. The cowl 4 has an axial length in the direction of the axis of the cylinder slightly greater than the axial length of the rotary cutting head 3 and a height in a direction perpendicular to the last mentioned direction approximately equal to the overall diameter of the cutting head 3. The arcuate cowl 4 serves to maintain the cuttings in close contact with the cutting head 3 so that effectively all the cuttings are loaded by the cutting assembly. Sealing strips (not shown) which may be formed from, for example, rubber or steel are provided between the edges of the arcuate cowl 4 and the adjacent mine roof, floor and coal face to prevent the cuttings passing around these edges.

When it is required to cut in the reverse direction, i.e. from left to right in the drawing, the cowl 4 is removed from its mounting brackets and mounted on similar mounting brackets (not shown) on the opposite side of the cutting head 3, i.e. in the position shown by the chain line 4 in the drawing. The trailing portion of the cutting head 3 is again effectively enclosed by the cowl 4 and cutting and loading can again take place.

In circumstances where suitable height provisions exist or can be made in the stable hole at each end of the face, the arcuate plate is pivotally mounted on the cutting assembly driving shaft bearing housing so that it can be swung over the top of the cutting head when it is required to reverse the direction of cutting.

In the alternative embodiment shown in FIGURES 3 and 4 the machine 10 comprises a motor unit 11 having attached at each end a gearbox 12, the motor 11 and gearboxes 12 being arranged for movement along an armoured flexible face conveyor 13 in known manner. The machine 10 may incorporate a haulage unit for effecting movement along the conveyor 13 or alternatively, a haulage remote from the machine may be used, operating through a haulage chain or rope extending along the coal face.

Projecting laterally from each gearbox 12 is an output shaft 14 on which is mounted a rotary cutting head 15 provided with one or more helical members 51 and cutting picks (not shown) in known manner, the path of the extremities of the picks being indicated by 52. The helical members 51 of each cutting head 15 are of opposite pitches arranged so that, when the machine is moving along the conveyor 13 and the leading rotary cutting head 15 is rotating, the cuttings are moved by this leading head from the coal face on to the conveyor 13. The portions of the cutting heads which face each other are effectively enclosed by cowls 16 which are mounted on the machine body by means of suitable brackets (not shown) and are each similar to the cowl 4 described above with reference to FIGURES 1 and 2.

In operation and with the machine travelling along a coal face from left to right as seen in FIGURES 3 and 4, the right hand cutting head 15 operates to cut the coal while its associated cowl 16 maintains the cuttings in close contact with the cutting head so that effectively all the cuttings are loaded by the cutting assembly. During this movement of the machine, the left hand cutting head remains inoperative. When the machine has travelled to the right hand extremity of the face, the conveyor is advanced and the machine then returns along the face with the left hand cutting assembly cutting and loading whilst the right hand cutting head remains inoperative.

Figure 5:
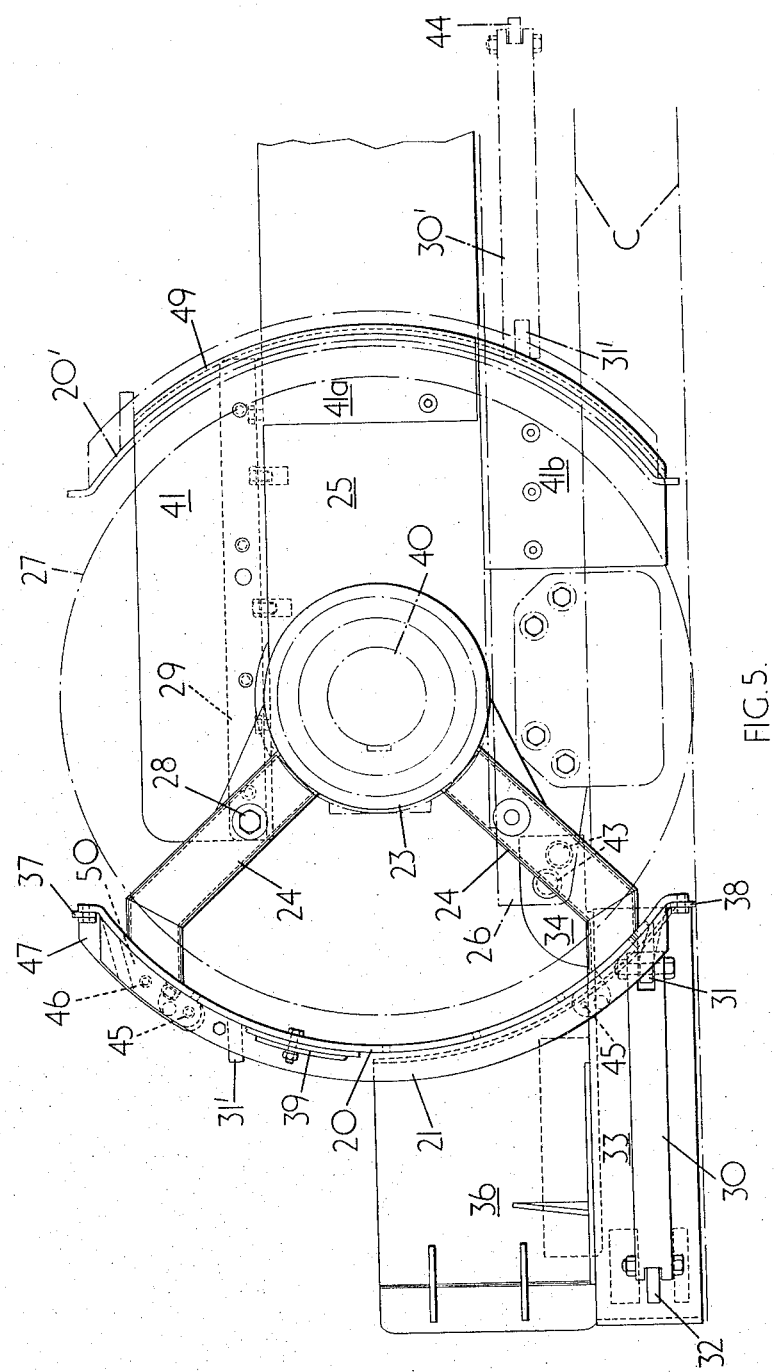
Figure 6:
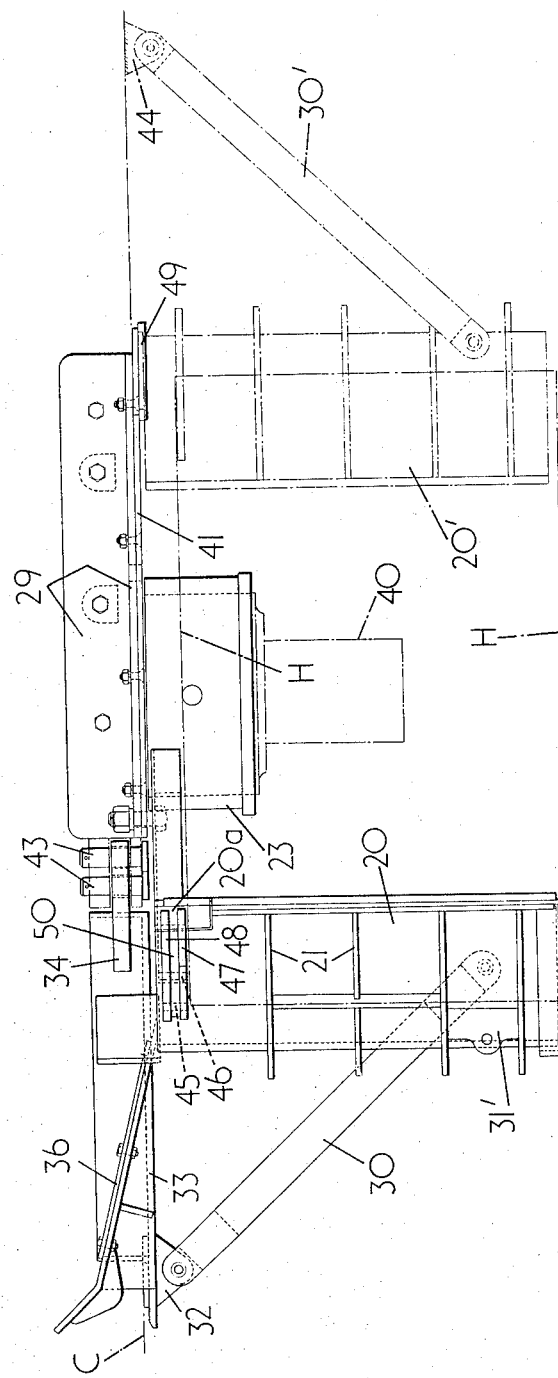
Figure 7:
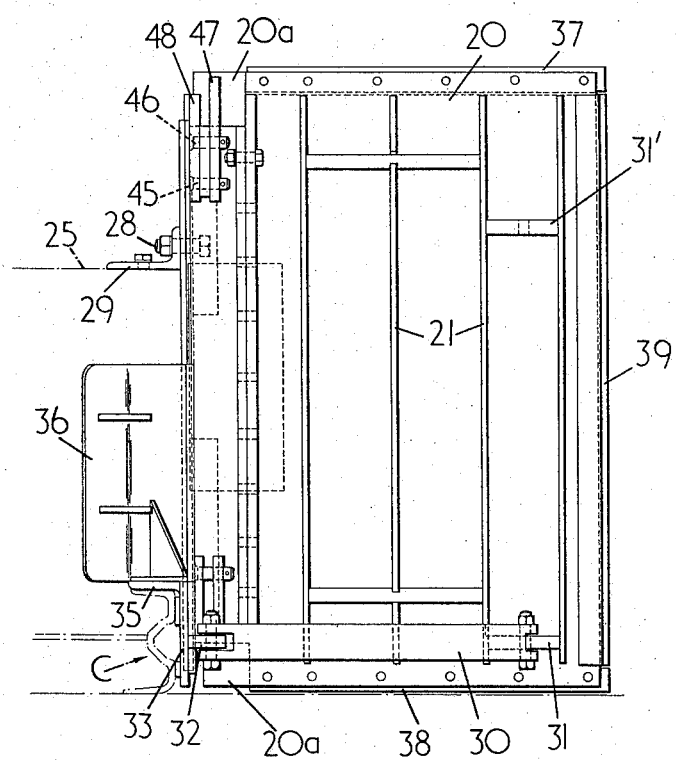

FIGURES 5, 6 and 7 show in more detail a suitable form of cowl forming part of a rotary cutting assembly in accordance with the present invention. This may be the form taken by the cowl 4 shown in FIGURES 1 and 2 or the cowls 16 shown in FIGURES 3 and 4.

Referring now to FIGURES 5, 6 and 7, the cowl comprises a curved plate 20 of part-cylindrical form and provided with strengthening ribs 21 extending vertically between opposed straight parallel edges of the plate 20. The plate 20 is carried by a cylindrical sleeve 23 by means of a pair of radial box-section arms 24 each of which has one end secured to the sleeve 23 and its opposite end bent or angled and secured to the plate 20.

The sleeve 23 is disposed co-axial with the axis of curvature of the curved plate 20, and is rotatably mounted on a bearing housing through which passes a drive shaft 40 for a rotary cutting head (the bearing housing and head are not shown). The latter parts extend from a gearbox (part of which is shown at 25 in FIGURE 5) forming part of a mining machine having an underframe 26 (see FIGURE 5) which is adapted for travel along an armoured flexible face conveyor indicated by the chain lines C. The cutting head is of the drum or disc type carrying cutter picks and may have, for example, one or more helical members making complete turns about the axis of the cutting head, or a plurality of box-section wings extending helically from the face side of the head towards the mining machine, or be of any other type of similar drum or disc which is adapted to effect axial discharge of at least a proportion of the mineral cut by the cutting head for example, of the kind shown schematically in FIGS. 1-4 of the drawing. The curved path of the cutter picks carried on the cutting head is indicated by the chain line 27 in FIGURE 5, and it will be seen in this figure, that the curved plate 20 is maintained by the arms 24 and sleeve 23, closely adjacent and parallel to the path 27.

The curved plate 20 is secured in position on the left hand side of the cutting head as viewed in FIGURE 5, by a bolt or pin 28 which passes through an aperture formed in the upper arm 24 and corresponding holes formed in a horizontal angle plate 29 mounted on and securely bolted to the gearbox 25 and a vertical side plate 41 (see below). The curved plate 20 is further maintained in position by a stay member 30 pivotally connected between a bracket 31 secured to the curved plate 20, and a bracket 32 projecting laterally from the vertical limb of an angle plate 33. This latter plate is arranged to slide along the face-side of the conveyor C and is connected to the underframe 26 by means of an upstanding lug 34 and pins 43. The horizontal limb of the angle plate 33 projects over the faceside of the conveyor C and supports an upstanding deflector plate 36 inclined to the axis of the conveyor C and serving to centralise material loaded on to the conveyor by the cutting head.

The axial length of the part-cylindrical curved plate 20 in the direction of the axis of the cylinder is slightly greater than the axial length of the cutting head, the lateral extremities of which are indicated by the chain lines H in FIGURE 6, and the plate 20 has an overall height in a direction perpendicular to the last mentioned direction approximating to but somewhat less than the overall diameter of the cutting head, i.e. the diameter of the circle 27 swept out by the cutter picks. It will be appreciated that a cowl exactly equal in height to the diameter of the cutting head would be liable to wedge between the roof and floor of the mine face and in consequence suffer damage and/or increase the power required to haul the mining machine along the face.

Clearance between the upper and lower parallel edges of the cowl and the roof and floor of the mine respectively is reduced by the provision of sealing strips 37, 38, bolted to the respective edge. Similarly clearance between the face side curved edge of the cowl and the mineral face is reduced by a sealing strip 39 (part only of which is shown in FIGURE 5). The strips 37, 38 and 39 may be made, for example, old conveyor belting or steel.

In operation the cowl is secured in position to effectively enclose the trailing portion of the cutting head as the mining machine travels along the face. Mineral cut by the cutting head is maintained in close proximity to the cutting head by the cowl together with the mine floor, roof and face with the result that substantially the whole of the cuttings are loaded directly by the cutting head on to the conveyor. The cut mineral is discharged from the cutting head through the "throat" defined by the radial arms 24 and the cowl 20 (see particularly FIGURE 5) and it is desirable that this throat area is as large as possible having regard to the satisfactory support of the cowl on the mining machine.

When the machine reaches the end of the mine face, the cowl 20 is released by removing the bolt or pin 28 and stay member 30, swung over the cutting head, the sleeve 23 pivoting about the bearing housing to permit this swinging, and then secured in the position indicated by the chain line 20 in FIGURES 5 and 6. In this second position on the opposite side of the axis of the cutting head, the locking bolt or pin 28 is again inserted through holes in the upper arm 24 and the angle plate 29, and the stay member (shown by chain line 30′) is pivotally connected between a bracket 44 secured to the face side of the underframe 26 and a second bracket 31′ attached to the curved plate 20.

In order to prevent fouling of the goaf side upper and lower edges of the cowl 20 by ridges in the mine roof and floor respectively which may arise through variations in the cutting horizon of the mining machine, the cowl 20 includes at these locations separable corner portions 20a which can be removed, when necessary. Each corner portion 20a has secured to it a pair of parallel and spaced arms 47, 48 which are positioned one on each side of a bracket 50 secured to the cowl 20, each portion 20a being locked in position by a hinge pin 45 and locking pin 46 inserted through holes in the arms 47, 48 and corresponding holes in the bracket 50. Each portion 20a can be removed by withdrawing the respective locking pin 46 and pivoting the portion 20a about the respective hinge pin 45.

The vertical side plate 41 is a composite plate including an upper portion bolted to the angle plate 29, a downwardly directed portion 41a, and a separate lower portion 41b attached to the underframe 26, and this composite plate serves to prevent cut material passing between the goaf-side edge of the cowl 20 and the face-side of the mining machine. The plate 41 has a curved right hand edge (as viewed in FIGURE 5) corresponding in curvature to the curvature of the cowl 20, and extending along this curved edge is a laterally-extending, part annular flange 49. When the cowl 20 is positioned on the right hand side of the cutting head axis (i.e. as shown at 20' in FIGURE 5), the goaf-side edge of the cowl 20 is located immediately adjacent the flange 49 to close the gap which would otherwise exist between the cowl 20 and the mining machine.

It will be understood that modifications may be introduced into the invention as described above, for example whilst only conveyor mounted machines have been described in the above embodiments, the invention is in no way limited to such machines, and may be applied to floor-mounted machines. In this case in order to obtain the maximum benefit from the invention it is preferred to provide rotary cutting assemblies at each end of the machine in a manner somewhat similar to the embodiment described above with reference to FIGURES 3 and 4.

I claim:
1. A longwall mining machine comprising a body adapted to be hauled along a longwall mining face, a drive shaft projecting laterally of the body and having an overhanging portion arranged at right angles to and alongside the body, said drive shaft being connected to drive means carried by the body, a cylindrical shearer drum which is supported upon the drive shaft for rotation therewith and about its cylindrical axis, and which is adapted to carry cutter tools operable upon rotation of the drum and bodily movement of the body to excavate a mineral face, loading members arranged helically upon the drum and adapted to discharge cut mineral axially of the drum as the drum is rotated, a cowl plate presenting a curved surface, support means connected to the machine body and adapted to carry the cowl plate closely adjacent the trailing end of the drum so that said curved surface extends closely adjacent and parallel to the trailing part of the circular path swept out by the cutter tools upon rotation of the drum, said cowl plate having a length in a direction parallel to the axis of the cylindrical drum at least equal to the axial length of the drum and a height in a direction perpendicular to said first direction approximately equal to the overall diameter of the drum, said support means comprising an inner cylindrical sleeve coaxial with the axis of curvature of said plate, and said cowl plate being pivotally mounted about the drive shaft of the shearer drum so that the cowl is selectively locatable on either side of the axis of rotation of the drum.

2. A longwall mining machine according to claim 1 wherein the cowl plate is secured to said inner cylindrical sleeve by means of a pair of spaced radial arms.

3. A longwall mining machine according to claim 1 wherein the cowl plate has opposed curved and parallel lateral edges and upper and lower opposed straight edges and sealing strips are provided extending along its opposed edges and along one of its curved edges.

4. A longwall mining machine according to claim 1 wherein a corner portion of the cowl plate is removable.

5. A longwall mining machine comprising a rotary cutting head of the shearer drum type offset laterally from the mining machine body with respect to the direction of travel of the machine, said head being adapted to carry cutter picks and being bodily movable in a direction transverse to the axis of rotation of said head to effect cutting of a mineral face, said head being further adapted upon rotation to discharge cut mineral axially of the drum, said mining machine further comprising a cowl plate having a curved surface arranged closely adjacent and parallel to a portion of the circular path swept by the cutter picks, said cowl plate having an axial length in the direction of the axis of the head at least equal to the axial length of said head and a height in a direction perpendicular to said first direction approximately equal to the overall diameter of the head, and said cowl plate being secured to an inner cylindrical sleeve coaxial with the axis of curvature of said plate and pivotally mounted about the cutter head drive shaft to be selectively locatable on either side of the axis of rotation of the head.

6. A longwall mining machine according to claim 5 wherein the cowl plate is secured to the inner cylindrical sleeve by means of a pair of spaced radial arms.

7. A longwall mining machine according to claim 5 wherein the cowl plate has opposed curved and parallel lateral edges and upper and lower opposed straight edges and sealing strips are provided extending along its opposed edges and along one of its curved edges.

8. A longwall mining machine according to claim 5 wherein a corner portion of the cowl member is removable.

References Cited by the Examiner

UNITED STATES PATENTS

| Re. 7,135 | 5/1876 | Sheldon | 299—45 |
| 2,740,618 | 4/1956 | Snyder et al. | 299—57 |
| 2,920,879 | 1/1960 | Driehaus | 299—66 X |
| 3,161,439 | 12/1964 | Newton et al. | 299—67 |

FOREIGN PATENTS

| 720,812 | 5/1942 | Germany. |

ERNEST R. PURSER, *Primary Examiner.*